US008274924B2

(12) United States Patent
Cai et al.

(10) Patent No.: US 8,274,924 B2
(45) Date of Patent: Sep. 25, 2012

(54) INTRA-DONOR CELL COORDINATED MULTI-POINT TRANSMISSION WITH TYPE 1 RELAY

(75) Inventors: Zhijun Cai, Irving, TX (US); Yi Yu, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 287 days.

(21) Appl. No.: 12/683,245

(22) Filed: Jan. 6, 2010

(65) Prior Publication Data

US 2011/0164542 A1 Jul. 7, 2011

(51) Int. Cl.
 *H04B 7/14* (2006.01)
(52) U.S. Cl. ........................................ 370/315
(58) Field of Classification Search ............ None
 See application file for complete search history.

(56) References Cited

U.S. PATENT DOCUMENTS

| | | | |
|---|---|---|---|
| 7,933,549 B2 | 4/2011 | Larsson | |
| 2008/0160912 A1* | 7/2008 | Kim et al. | 455/15 |
| 2009/0175214 A1 | 7/2009 | Sfar et al. | |
| 2009/0313518 A1* | 12/2009 | Shen et al. | 714/749 |
| 2010/0322146 A1* | 12/2010 | Liu et al. | 370/315 |
| 2010/0323684 A1 | 12/2010 | Cai et al. | |
| 2011/0007685 A1 | 1/2011 | Ma et al. | |
| 2011/0026473 A1* | 2/2011 | Luo et al. | 370/329 |
| 2011/0051654 A1 | 3/2011 | Blankenship et al. | |
| 2011/0090808 A1* | 4/2011 | Chen et al. | 370/252 |
| 2011/0096701 A1* | 4/2011 | Lin | 370/280 |

FOREIGN PATENT DOCUMENTS

EP 2112845 A1 10/2009

OTHER PUBLICATIONS

3GPP TSG-RAN1 #54; Discussion on DL Coordinated Multipoint Transmission; 12; Fujitsu; R1-083115; Jeju, Korea; Aug. 18-22, 2008; 7 pages.
3GPP TSG RAN WG1 Meeting #56; Discussion on Information Exchange Aspects of DL CoMP; 12.2 Coordinated Multipoint Transmission/Reception (CoMP); Panasonic; R1-090686; Athens, Greece; Febuary 9-13, 2009; 5 pages.
3GPP TSG RAN WG2 #65bis; Considerations on Relay Architecture; 7; ETRI; R1-092425; Seoul, Korea; Mar. 23-27, 2009; 4 pages.
European Extended Search Report; EP Application No. 11150334.8; Mar. 31, 2011; 12 pages.
Office Action dated Sep. 19, 2011; U.S. Appl. No. 12/683,242, filed Jan. 6, 2010; 31 pgs.
Cai, Zhijun, et al.; U.S. Appl. No. 12/683,236, filed Jan. 6, 2010; Title: Intra-Doner Cell Coordinated Multi-Point Transmission with Type 1 Relay.
Cai, Zhijun, et al.; U.S. Appl. No. 12/683,242, filed Jan. 6, 2010; Title: Intra-Donor Cell Coordinated Multi-Point Transmission with Type 1 Relay.

(Continued)

*Primary Examiner* — Anh-Vu Ly
(74) *Attorney, Agent, or Firm* — Conley Rose, P.C.; J. Robert Brown, Jr.

(57) ABSTRACT

A method is provided for communication in a wireless telecommunications system. The method comprises an access node acting as a master control but not acting as a serving node in a coordinated multi-point (CoMP) transmission with a relay node toward a user equipment. The method further comprises the access node retaining a copy of data packets that the access node sends to the relay node for the CoMP transmission.

20 Claims, 5 Drawing Sheets

OTHER PUBLICATIONS

3GPP TSG-WG2 Meeting #65; R2-091112; Change Request; 25.331 CR rev-8.5.0; Athens, Greece; Feb. 9-13, 2009; 3 pages.

3GPP TSG-RAN WG2 Meeting #66; MCCG/MTCH MBMS Areas; 6.3.1; Discussion decision; Huawei; R2-092969; San Francisco, USA; May 4-8, 2009; 2 pages.

3GPP TSG RAN WG1 Meeting #57bis; 15.3; Discussion on Relay in CoMP; Discussion and decision; Huawei; R1-092371; Los Angeles, USA; Jun. 29-Jul. 3, 2009; 3 pages.

3GPP TSG RAN WG1 Meeting #58; On the COMP intra-cell based on Type I relay; 15.3; Discussion; Potevio; R1-093445; Shenzhen, China; Aug. 24-28, 2009; 6 pages.

3GPP TR 36.814; 3rd Generation Partnership Project; Technical Specification Group Radio Access Network; Further Advancements for E-UTRA Physical Layer Aspects; (Release 9); Feb. 2009; 31 pages; V0.4.1 Technical Report; 3GPP Organizational Partners.

3GPP TS 36.331; 3rd Generation Partnership Project; Technical Specification Group Radio Access Network; Evolved Universal Terrestrial Radio Access (E-UTRA) Radio Resource Control (RRC); Protocol Specification; (Release 8); Jun. 2009; 207 pages; V8.6.0 Technical Specification; 3GPP Organizational Partners.

3GPP TS 36.321; 3rd Generation Partnership Project; Technical Specification Group Radio Access Network; Evolved Universal Terrestrial Radio Access (E-UTRA) Medium Access Control (MAC) Protocol Specification; (Release 8); Jun. 2009; 47 pages; V8.6.0 Technical Specification; 3GPP Organizational Partners.

3GPP TSG-RAN WG2 Meeting #66bis; TP to 36.912 on Relays and Carrier Aggregation; Discussion and Decision; Nokia Siemens Networks; R2-093694; Los Angeles, U.S.A.; Jul. 3-29, 2009; 6 pages.

3GPP TSG RAN WG1 Meeting #59; Intra-Donor Cell eNB-Relay CoMP and its Performance Analysis; Dicussion and Decision; Research in Motion UK Limited; R1-094465; Jeju, Korea; Nov. 9-13, 2009; 4 pages.

3GPP TR 36.814; 3rd Generation Partnership Project; Technical Specification Group Radio Access Network; Further Advancements for E-UTRA Physical Layer Aspects; (Release 9); Nov. 2009; 53 pages; V1.5.0 Technical Report; 3GPP Organizational Partners.

European Extended Search Report; EP Application No. 11150333.0; Apr. 27, 2011; 12 pages.

European Extended Search Report; EP Application No. 11150332.2; May 30, 2011; 7 pages.

3GPP TSG RAN WG1 Meeting #55; Relaying for LTE-Advanced; Discussion; Alcatel Shanghai Bell, Alcatel-Lucent; R1-084136; Prague, Czech Republic; Nov. 10-14, 2008; 6 pages.

3GPP TSG-RAN WG1 Meeting #57; Considerations on Coexistence of Different Types of Relays; Discussion/Decision; LG Electronics Inc.; R1-092117; San Francisco, USA; May 4-8, 2009, 2 pages.

3GPP TSG-RAN WG1 Meeting 57; Control Signalling for Relay Nodes; Discussion, Decision; Panasonic; R1-091737; San Francisco, USA; May 4-8, 2009; 4 pages.

3GPP TSG-RAN WG1 Meeting #56bis; CoMP Scheduling Considering Different Types of Relay Nodes; Discussion/ Decision; LG Electronics Inc.; R1-091190; Seoul, Korea; Mar. 23-27, 2009; 3 pages.

Cai, Zhijun, et al.; U.S. Appl. No. 13/357,412, filed Jan. 24, 2012 ; Title: Intra-Donor Cell Coordinated Multi-Point Transmission with Type 1 Relay.

Office Action dated Jan. 30, 2012; U.S. Appl. No. 12/683,236, filed Jan. 6, 2010; 21 pages.

Final Office Action dated May 29, 2012; U.S. Appl. No. 12/683,236 filed Jan. 6, 2010; 12 pages.

Advisory Action dated Aug. 7, 2012; U.S. Appl. No. 12/683,236 filed Jan. 6, 2010; 3 pages.

\* cited by examiner

INTRA-DONOR CELL COORDINATED MULTI-POINT TRANSMISSION WITH TYPE 1 RELAY

BACKGROUND

As used herein, the terms "user equipment" and "UE" can refer to wireless devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" may also refer to devices that have similar wireless capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long Term Evolution (LTE) and LTE-Advanced (LTE-A). For example, an LTE or LTE-A system might include an Evolved Universal Terrestrial Radio Access Network (E-UTRAN) node B (eNB), a wireless access point, or a similar component rather than a traditional base station. As used herein, the term "access node" will refer to any component of a wireless network, such as a traditional base station, a wireless access point, or an LTE or LTE-A eNB, that creates a geographical area of reception and transmission coverage allowing a UE or a relay node to access other components in a telecommunications system. An access node may comprise a plurality of hardware and software.

The term "access node" may not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or a relay node. It is understood that a component might operate as an access node or a relay node depending on its configuration and placement. However, a component is called a "relay node" only if it requires the wireless coverage of an access node or another relay node to access other components in a wireless communications system. Additionally, two or more relay nodes may be used serially to extend or enhance coverage created by an access node.

These systems can include protocols such as a Radio Resource Control (RRC) protocol, which is responsible for the assignment, configuration, and release of radio resources between a UE and a network node or other equipment. The RRC protocol is described in detail in the Third Generation Partnership Project (3GPP) Technical Specification (TS) 36.331, which is incorporated herein by reference for all purposes.

The signals that carry data between UEs, relay nodes, and access nodes can have frequency, time, space, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UE or network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
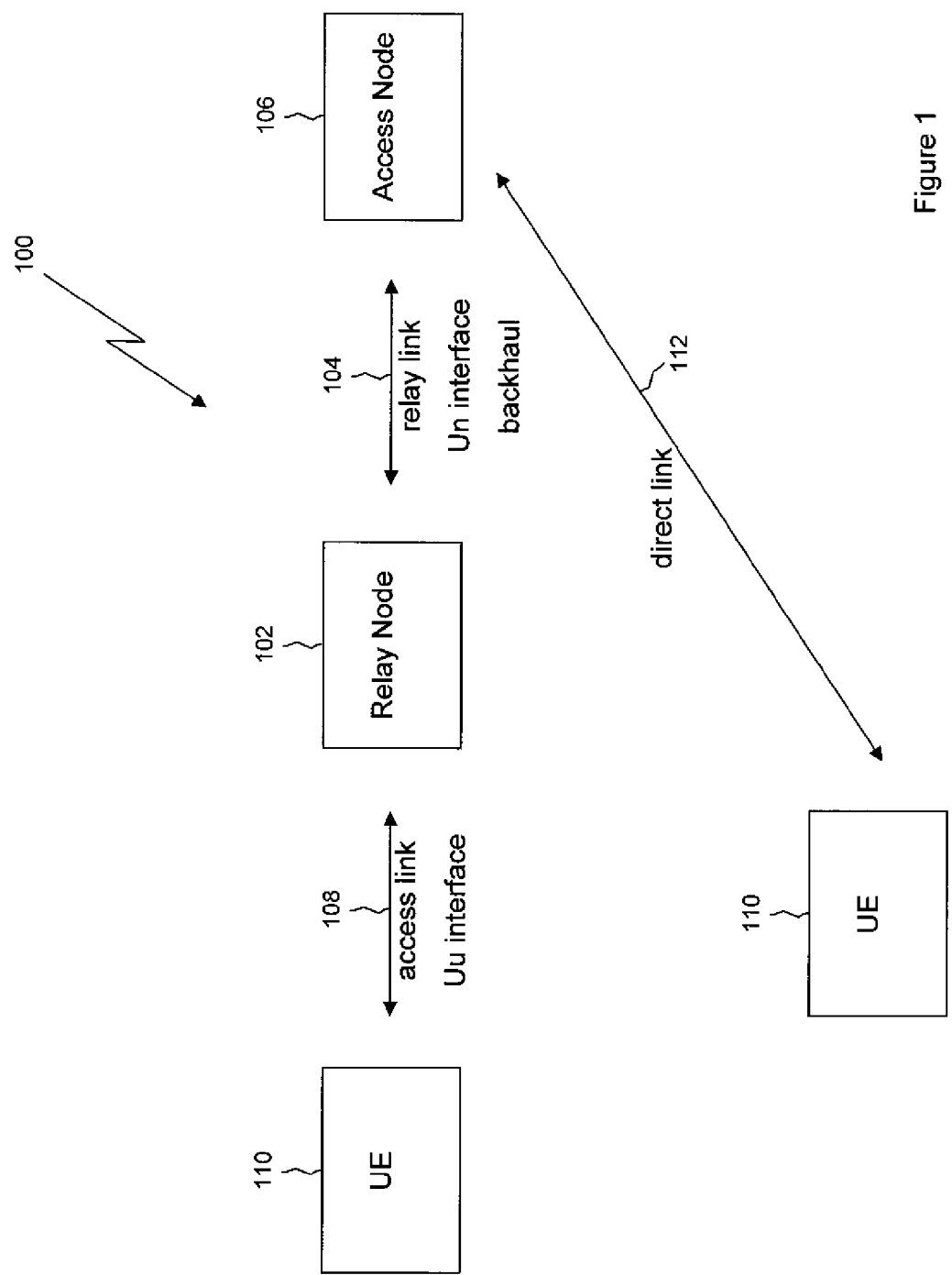
FIG. 1 is a diagram illustrating a wireless communication system that includes a relay node, according to an embodiment of the disclosure.

FIG. 1 is a diagram illustrating a wireless communication system 100 in which embodiments of the present disclosure may be implemented. Examples of the wireless communication system 100 include LTE or LTE-A networks, and all of the disclosed and claimed embodiments could be implemented in an LTE-A network. A relay node 102 can receive a signal from a UE 110 and transmit the signal to an access node 106, which could also be referred to as a donor eNB (DeNB). A cell controlled by a DeNB can be referred to as a donor cell. In some implementations of the relay node 102, the relay node 102 receives a signal with data from the UE 110 and then generates a new signal to transmit the data to the access node 106. The relay node 102 can also receive data from the access node 106 and deliver the data to the UE 110.

The relay node 102 might be placed near the edges of a cell so that the UE 110 can communicate with the relay node 102 rather than communicating directly with the access node 106 for that cell. In radio systems, a cell is a geographical area of reception and transmission coverage. Cells can overlap with each other. In a typical situation, one access node is associated with each cell. The size of a cell is determined by factors such as frequency band, power level, and channel conditions. One or more relay nodes, such as relay node 102, can be used to enhance coverage within a cell or to extend the size of coverage of a cell. Additionally, the use of a relay node 102 can enhance the throughput of a cell because the UE 110 can access the relay node 102 at a higher data rate than the UE 110 might use when communicating directly with the access node 106 for that cell, thus creating higher spectral efficiency. The use of a relay node 102 can also decrease the UE's battery usage by allowing the UE 110 to transmit at a lower power.

When the UE 110 is communicating with the access node 106 via the relay node 102, the links that allow wireless communication can be said to be of three distinct types. The communication link between the UE 110 and the relay node 102 is said to occur over an access link 108, which can also be referred to as the Uu interface. The communication between the relay node 102 and the access node 106 is said to occur over a relay link 104, which can also be referred to as the Un interface or the backhaul link. Communication that passes directly between the UE 110 and the access node 106 without passing through the relay node 102 is said to occur over a direct link 112.

Relay nodes can be divided into three kinds: layer one relay nodes, layer two relay nodes, and layer three relay nodes. A layer one relay node is essentially a repeater that can retransmit a transmission without any modification other than amplification and possibly slight delay (or some other simple layer 1 operations). A layer two relay node can demodulate/decode a transmission that it receives, re-modulate/re-encode the demodulated/decoded data, and then transmit the re-modulated/re-encoded data. A layer three relay node can have full radio resource control capabilities and can thus function similarly to an access node. The illustrative embodiments herein are primarily concerned with layer three relay nodes.

The radio resource control protocols used by a relay node may be the same as those used by an access node, and the relay node may have a unique cell identity. Relay nodes known as Type 1 relay nodes may have their own physical cell IDs and transmit their own synchronization signals and reference symbols. In addition, a UE can receive scheduling information and hybrid automatic repeat request (HARQ) feedback directly from a Type 1 relay node and send its control channels (such as a scheduling request (SR), a channel quality indicator (CQI), and/or an acknowledgement (ACK)) to a Type 1 relay node. To a Release 10 UE, a Type 1 relay node may appear as a different entity than an access node to allow for further performance enhancement, but to a Release 8 UE, a Type 1 relay node appears as a Release 8 access node (i.e., it is backward compatible). The embodiments disclosed herein deal primarily with Type 1 relay nodes for simplicity. However, the disclosed embodiments may also apply to other types of relays, for example, Type 2 relays.

Relay nodes known as Type 2 relay nodes do not have separate cell IDs and thus do not create any new cells. That is, a Type 2 relay node does not transmit a physical ID that is different from the access node ID. A Type 2 relay node can relay signals to and from legacy (LTE Release 8) UEs, but Release 8 UEs are not aware of the presence of Type 2 relay nodes. A Type 2 relay node can also relay signals to and from LTE-A Release 10 and later UEs. LTE-A Release 10 and later UEs might be aware of the presence of a Type 2 relay node. As used herein, the term "Release 10" refers to any UE capable of following LTE standards later than LTE Release 8 or LTE Release 9, the term "Release 8" refers to any UE capable of following only the LTE standards of LTE Release 8, and the term "Release 9" refers to any UE capable of following the LTE standards of LTE Release 8 and Release 9.

The concept of coordinated multi-point transmission and reception (CoMP) has recently been introduced to improve transmission quality and capacity in wireless telecommunications networks. With CoMP, a plurality of access nodes can transmit to and receive from one or more UEs in a plurality of overlapping cells. Prior to a CoMP transmission, the access nodes may coordinate with one another in order to agree on the scheduling for the CoMP transmission, the modulation and coding scheme (MCS) for the CoMP transmission, the transmission mode for the CoMP transmission, the multi-antenna functions, the pre-coding matrix index (PMI), the rank indicator (RI), allocated resource block information, and other scheduling and control information that will be used for the CoMP transmissions. Hereinafter, any such information will be referred to as CoMP control information.

When a plurality of access nodes transmit to a UE using the agreed-upon CoMP control information, the transmissions can constructively overlay one another at the location of that particular UE. The coordinated transmissions do not interfere with transmissions intended for other UEs, and potentially interfering transmissions intended for other UEs are greatly reduced at the location of the UE receiving the coordinated transmission. In this way, CoMP can greatly improve a UE's reception in regions of overlapping cells. Details of CoMP operations can be found in 3GPP TS 36.814, which is incorporated herein by reference for all purposes.

In an embodiment, CoMP is used for transmissions made by at least one access node and at least one relay node. Due to the close coupling between an access node and a Type 1 relay node inside a donor cell, CoMP may improve system performance. For example, the efficient backhaul between the access node and the relay node may be used to allow fast collaboration for CoMP purposes. As described in detail below, functions that are performed solely by an access node in traditional CoMP are split between the access node and the relay node in the embodiments herein. Also, several techniques are provided herein for preventing convoluted data forwarding between an access node and a relay node that are involved in a CoMP transmission.

The transmission power of an access node is typically much higher than that of a relay node. For example, the transmission power of an access node could be 46 dBm, while the transmission power of a relay node could be 30 dBm. Therefore, in practice, a relay node can cover only a small area. For UEs at the edge of a relay cell and close to an access node, it may be beneficial to use CoMP technology to further improve the throughput. Advantages of using CoMP include the fact that the access node needs to transmit data to the relay node in any event for forwarding purposes. Hence, the access node always has a copy of the data available, and there may be no need for extra forwarding from the relay node to the access node. Also, fast backhaul control signaling is available via the relay physical downlink control channel (R-PDCCH) or the relay physical downlink shared channel (R-PDSCH). Hence, the coordination between the access node and the relay node can be quite efficient. In addition, the access node can provide master control of the CoMP operations, such as centralized scheduling.

Figure 2:
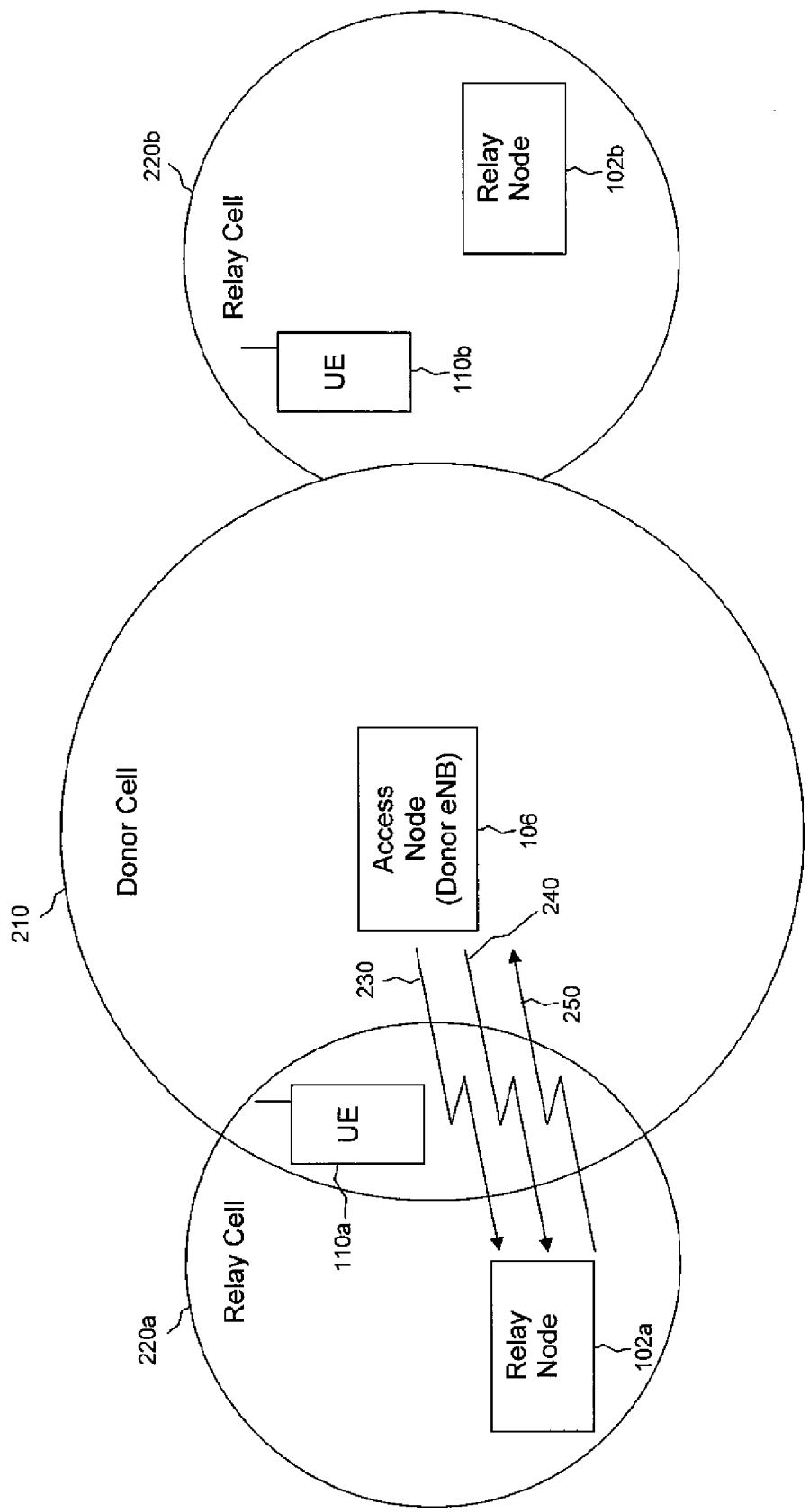
FIG. 2 is a diagram of an illustrative telecommunications system including a donor cell and a plurality of relay cells, according to an embodiment of the disclosure.

A system in which these concepts might be implemented is illustrated in FIG. 2, where a donor cell 210 is served by an access node 106 or DeNB. A plurality of relay nodes 102 are present, which may create relay cells 220 that overlap the boundaries of the donor cell 210. Two relay cells 220 are shown, but other numbers of relay cells might be present. An R-PDCCH 230 and an R-PDSCH 240 carry control plane data and user plane data, respectively, from the access node 106 to the relay node 102. A relay physical uplink shared channel (R-PUSCH) 250 carries user plane data from the relay node 102 to the access node 106.

A plurality of UEs 110 can communicate with the access node 106 and/or one or more of the relay nodes 102. In this example, two UEs 110 are shown, but in other embodiments other numbers of UEs 110 could be present. In an embodiment, since UE 110a is in a region overlapped by the donor cell 210 and the relay cell 220a, CoMP may be performed by the access node 106 and the relay node 102a for transmissions to UE 110a. Since UE 110b is not in a region overlapped by the donor cell 210 and the relay cell 220b, CoMP may not be performed efficiently for UE 110b.

In traditional CoMP, an access node 106 acts as both a master controller and a serving node. That is, the access node 106 makes decisions about functions such as the scheduling of transmissions and/or the selection of a modulation and coding scheme and/or the specification of other CoMP control information as described above. These functions can be referred to as master control functions, and an entity performing these functions can be referred to as a master control or master controller. After making these decisions, the access node 106 then transmits the CoMP control information to the UE 110 so that the UE 110 can properly receive CoMP-based transmissions from a plurality of access nodes 106. The transmission of CoMP control information to the UE 110 can be referred to as a serving node function, and an entity performing these functions can be referred to as a serving node.

In an embodiment, when at least one access node 106 is involved in CoMP-based transmissions with at least one relay node 102, the master control functions and the serving node function are split between the access node 106 and the relay node 102. More specifically, the access node 106 acts as the master control and the relay node 102 acts as the serving node. The relay node 102 forwards to the access node 106 the channel information it has received from the UE 110 and/or resource availability information (together with other information). The access node 106 makes the master control decisions and sends the CoMP control information to the relay node 102. The relay node 102 then acts as the serving node and delivers the CoMP control information to the UE 110 over the PDCCH.

In a network that includes relays, user plane data of a UE is always forwarded first from the access node to the relay nodes if the UE is served by the relay nodes. In CoMP operations, the serving node forwards user plane data to all other nodes that are involved in the CoMP transmissions. Therefore, in the case described above where a relay node acts as a serving node, the relay node might first receive the user plane data of the UE from the access node. Acting as the serving node, the relay node might then return to the access node the data that it just received from the access node. This convoluted data forwarding due to CoMP is not efficient on the backhaul and can consume the spectrum resources over the backhaul.

Figure 3:
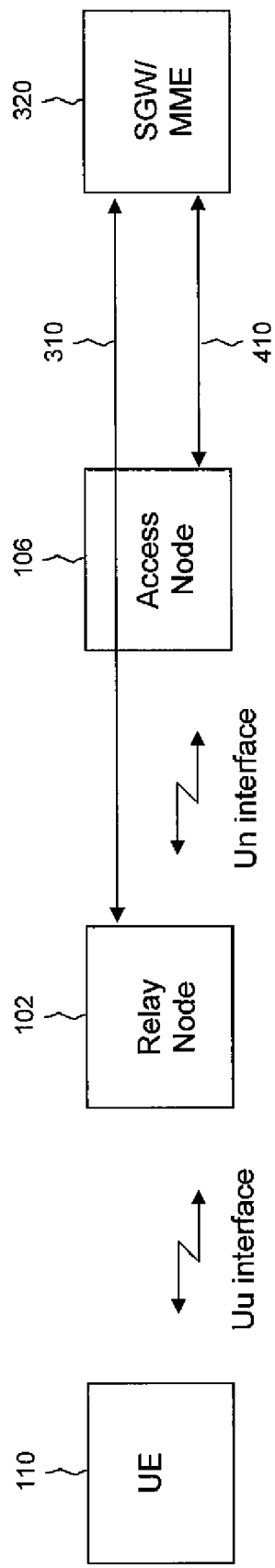
FIG. 3 is a diagram of an illustrative telecommunications system including an S1 path, according to an embodiment of the disclosure.

In an embodiment, techniques are provided to prevent this convoluted data forwarding between the access node and the relay node. The solutions may be different for different relay architectures. FIG. 3 illustrates two paths that data might follow under four different relay architectures. A path for tunneling data packets associated with the UE 110 might be terminated at either the relay node 102 or the access node 106. The path may be used, for instance, for tunneling General Packet Radio Service (GPRS) Tunneling Protocol (GTP) packets from an Enhanced Packet Core (EPC) to the relay node 102. This path may be referred to as the S1 path.

In some cases, an S1 path 310 terminates at the relay node 102. The S1 path 310 may be established between the relay node 102 and a serving gateway (SGW)/mobility management entity (MME) 320 or a similar component via the access node 106. Alternatively, an S1 path 410 to and from the SGW/MME 320 may terminate at the access node 106. The SGW/MME 320 may allow the UE 110 to communicate with an external network. Data packets may be directed or tunneled between the SGW/MME 320 and the relay node 102 or the access node 106, either of which may forward the packets to and from the UE 110.

In three of the four relay architectures discussed herein, the S1 interface 310 terminates at the relay node 102. In a first architecture, the relay node 102 is a full, layer three relay. In a second architecture, the access node 106 acts as a proxy S1/X2 interface, and the relay node 102 appears to the SGW/MME 320 to be a cell under the access node 106. In a third architecture, relay node bearers terminate at the access node 106. In a fourth architecture, the S1 interface 410 terminates at the access node 106.

In the first architecture, both the user plane and control plane of the S1 interface are terminated at the relay node 102. The user plane packets of the UE 110 are delivered via the SGW/MME 320 and the relay node's radio bearers. The SGW/MME 320 maps the incoming internet protocol (IP) packets to the GTP tunnels corresponding to the evolved packet system (EPS) bearer of the UE 110 and tunnels the packets to the IP address of the relay node 102.

In the second architecture, the user plane of the S1 interface is terminated at the relay node 102 and at the access node 106. The access node 106 acts as a proxy S1/X2 interface. The SGW/MME 320 maps the incoming IP packets to the GTP tunnels corresponding to the EPS bearer of the UE 110 and sends the tunneled packets to the IP address of the access node 106. Upon the access node 106 receiving the tunneled packets from the SGW/MME 320, the received packets are de-tunneled, and the user IP packets are mapped to the GTP tunnels again and sent to the IP address of the relay node 102.

In the third architecture, the user plane of the S1 interface is terminated at the relay node 102. The SGW/MME 320 maps the incoming IP packets to the GTP tunnels corresponding to the EPS bearer of the UE 110 and sends the tunneled packets to the IP' address of the relay node 102. The access node 106 simply acts as an IP router and forwards GTP/UDP/IP packets between two interfaces. The access node 106 performs this router functionality via the packet data network gateway—(PGW)-like functionality in the access node 106. The access node 106 also performs other PGW-like functionality for the UE side of the relay node 102, such as management of quality of service.

In the fourth architecture, the user plane of the S1 interface terminates at the access node 106, rather than at the relay node 102 as in the first three architectures. In this architecture, the SGW/MME 320 maps the incoming IP packets to the GTP tunnels corresponding to the EPS bearer of the UE 110 and sends the tunneled packets to the IP address of the access node 106. Upon the access node 106 receiving the tunneled packets from SGW/MME 320, the received packets are de-tunneled, and the inner user IP packets are mapped to the Un radio bearers corresponding to the EPS bearer of the UE 110. Each EPS bearer of UE 110 is mapped to a separate radio bearer over the Un interface.

For the first, second, and third architectures, the access node 106 acts as a transporter for carrying user plane data packets to the relay node 102. The access node 106 does not typically look into the data packets that pass through it in these architectures, since the data terminates at the relay node 102. In the fourth architecture, the S1 termination is at the access node 106, so the access node 106 already looks into each packet that it receives under this architecture.

In an embodiment, to prevent the convoluted data forwarding described above, in either of the first, second, or third architectures, the access node 106 looks into the packets that pass through it that are bound for a UE for which the access node 106 is performing a CoMP transmission together with the relay node 102. The access node 106 then retains a copy of the packets that are bound for that UE so that the relay node 102 does not need to forward those packets back to the access node 106 at a later time. More specifically, for the first, second, or third architectures, the following steps can be taken to prevent convoluted data forwarding. For the fourth architecture, as described below, these steps can be simplified.

When the relay node 102 identifies that the access node 106 is a CoMP coordinating node for the UE 110 which is served by the relay node 102, the relay node 102 sends high layer signaling (for example, MAC layer signaling such as MAC control elements, RRC layer signaling, or X2-based signaling) to the access node 106 to indicate that the relay node 102 and the access node 106 will cooperate in a CoMP transmission to that UE 110. Along with this indication, the relay node 102 also sends at least the following information to the access node 106: the identification of the UE, one or more UE bearer GTP tunnel endpoint identifiers (TEIDs), and the relay node radio bearer configuration information that carries the corresponding UE's GTP tunneling.

The access node 106 uses the received information to identify the UE's packets that might need CoMP transmission in the future. In one embodiment, the access node 106 then first identifies the Packet Data Convergence Protocol (PDCP) queue of the relay node 102 to which this UE 110 belongs based on the relay node radio bearer configuration context. Furthermore, the access node 106 checks the GTP/UDP/IP header of each packet in the PDCP buffer or queue to identify the packets that belong to the UE 110 and may be transmitted in a CoMP transmission in the future. In other embodiments, different checking techniques can be used to identify the UE's packet based on the received information.

After the access node 106 forwards the data packets to the relay node 102 for that particular UE 110 according to the access node's normal operation, the access node 106 keeps a copy of the data and saves it in a CoMP buffer for that particular UE 110. This is in contrast with the typical case where the access node 106 may delete the data after the data has been forwarded successfully to the relay node 102.

Optionally the access node 106 makes the CoMP decisions as described above and forwards the CoMP control information to the relay node 102. In another embodiment, the relay node 102 makes the CoMP decisions and forwards the CoMP control information to the access node 106. It should be noted that CoMP normally occurs in the MAC layer and that the access node 106 currently retains only the PDCP protocol data units (PDUs). Therefore, the access node 106 may need additional information to form the appropriate transport block for CoMP operations. In one embodiment, the relay node 102 forwards all the necessary information to the access node 106 in order for the access node 106 to form the MAC transport block on the access node side before the CoMP transmission. For example, the relay node 102 might send layer 2 segmentation/concatenation information. In another embodiment, the relay node 102 forwards a complete MAC PDU to the access node 106 but with no payload (zero payload) but with the format of the MAC PDU complete. (Normally, the payload takes most of the MAC PDU.) The access node 106 then places the payload in the MAC PDU and engages in the CoMP operation. In this embodiment, the relay node 102 prepares the MAC PDU format and forwards to the access node 106, and the access node 106 fills payload into the format. In this way, the coordinated transmission between the access node 106 and the relay node 102 could be performed. It should be noted that this embodiment could be generally applied to any CoMP operations for cooperation purposes.

If the relay node 102 determines that the access node 106 is no longer a CoMP coordinating node for the UE 110, the relay node 102 sends high layer signaling to the access node 106 to release the CoMP operation. After receiving the signaling, the access node 106 clears the CoMP buffer for that particular UE 110. The access node 106 will not retain the data for that particular UE 110 in the future.

For the fourth relay architecture, the S1 termination is in the access node 106 rather than the relay node 102 as in the first three architectures. As mentioned above, since the access node 106 already looks into the data packets that it receives under the fourth architecture, the steps described above for preventing convoluted data forwarding can be simplified under this architecture.

As with the first three architectures, when the relay node 102 identifies that the access node 106 is a CoMP coordinating node for the UE 110, the relay node 102 sends high layer signaling (such as MAC layer signaling, RRC layer signaling, or X2-based signaling) to the access node 106 to indicate that fact. Along with this indication, the relay node 102 also sends at least the UE ID to the access node 102. This can be contrasted with the situation under the first three architectures where the relay node 102 sends at least the UE ID, one or more UE bearer GTP TEIDs, and the relay node radio bearer configuration information that carries the corresponding UE's GTP tunneling.

As with the first three architectures, the access node 106 uses the received UE ID information to identify the UE's packets that might need CoMP transmission in the future. However, in contrast with the first three architectures, there is no need for the access node 106 to then identify the PDCP queue of the relay node 102 to which the UE 110 belongs or to check the GTP/UDP/IP header of each packet in the PDCP buffer to identify the packets that belong to the UE 110 and may be transmitted in CoMP transmissions in the future. This is due to the fact that in the fourth relay architecture, the access node 106 already looks into the data packets of the UE 110. Subsequent steps described above for the first three architectures can then be followed for the fourth architecture.

Figure 4:
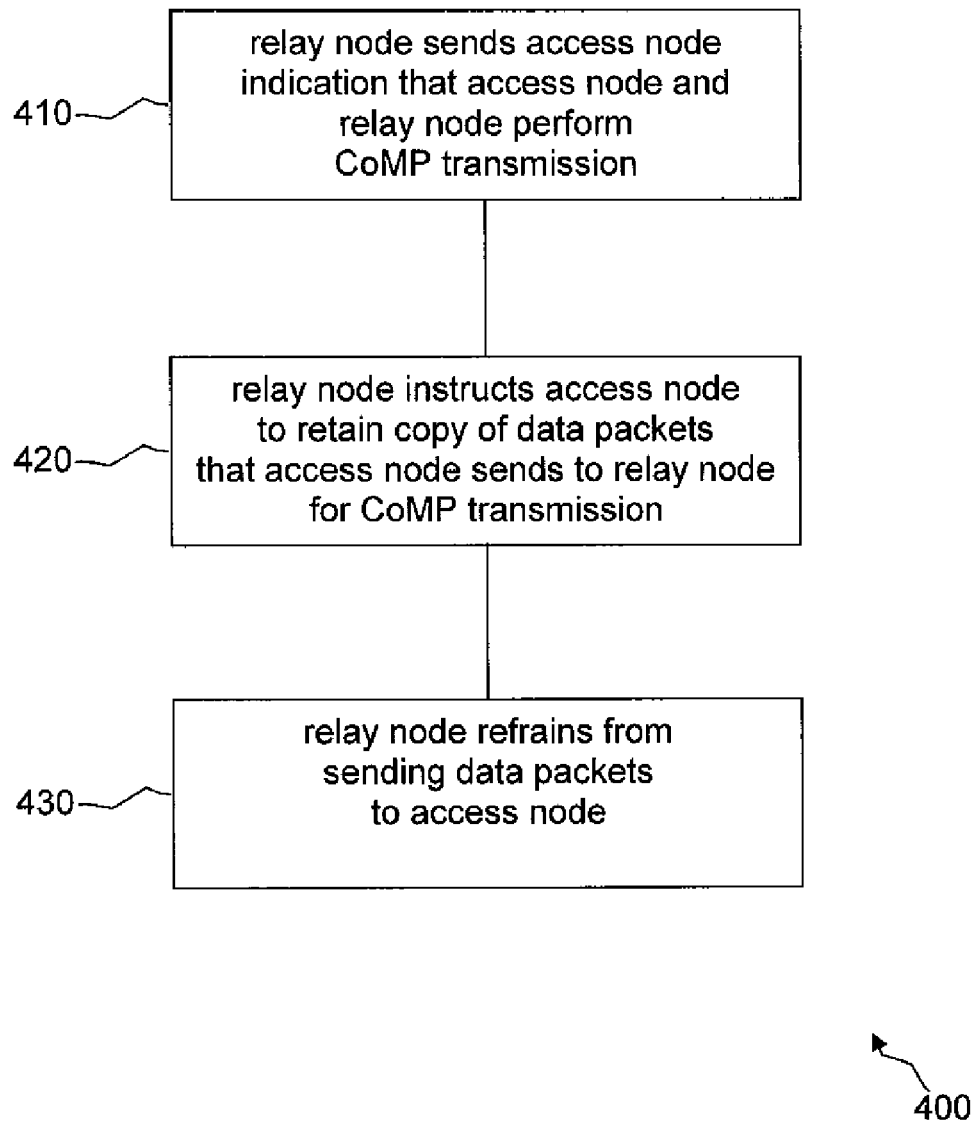
FIG. 4 illustrates an embodiment of a method for communication in a wireless telecommunications system, according to an embodiment of the disclosure.

FIG. 4 illustrates an embodiment of a method 400 for communication in a wireless telecommunications system. At block 410, a relay node sends an access node an indication that the access node and the relay node perform a CoMP transmission. At block 420, the relay node instructs the access node to retain a copy of data packets that the access node sends to the relay node for the CoMP transmission. At block 430, the relay node refrains from sending the data packets to the access node.

Figure 5:
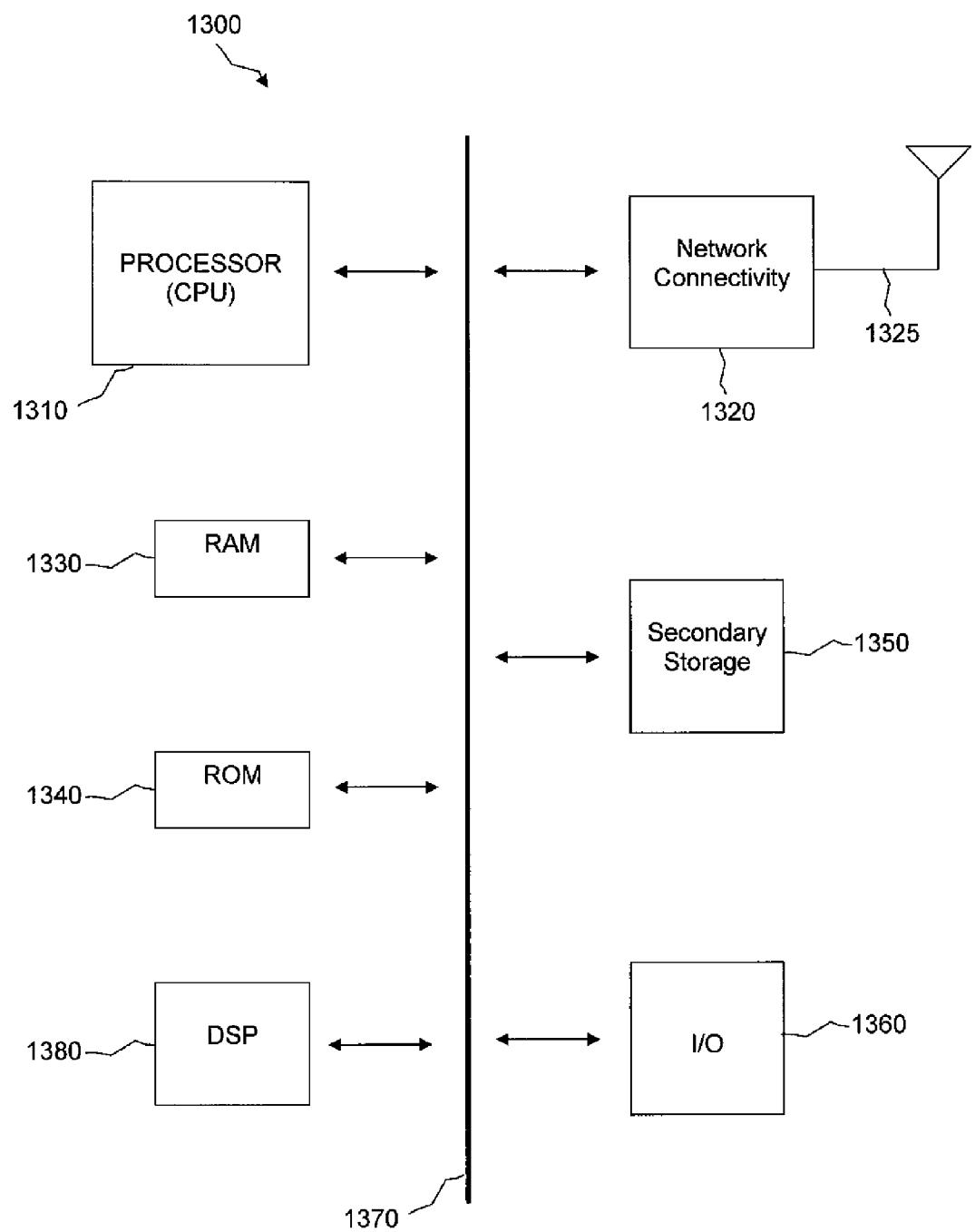
FIG. 5 illustrates a processor and related components suitable for implementing the several embodiments of the present disclosure.

The UE 110, access node 106, relay node 102, and other components described above might include a processing component that is capable of executing instructions related to the actions described above. FIG. 5 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM)

1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

The following are incorporated herein by reference for all purposes: 3GPP TS 36.321, 3GPP TS 36.331, and 3GPP TS 36.814.

In an embodiment, a method is provided for communication in a wireless telecommunications system. The method comprises an access node retaining a copy of data packets that the access node sends to a relay node for a CoMP transmission.

In another embodiment, an alternative method is provided for communication in a wireless telecommunications system. The method comprises a relay node instructing an access node to retain a copy of data packets that the access node sends to the relay node for a CoMP transmission. The method further comprises the relay node refraining from sending the data packets to the access node.

In another embodiment, an access node in a wireless telecommunications system is provided. The access node is configured such that the access node retains a copy of data packets that the access node sends to a relay node for a CoMP transmission.

In another embodiment, a relay node in a wireless telecommunications system is provided. The relay node is configured such that the relay node instructs an access node to retain a copy of data packets that the access node sends to the relay node for a CoMP transmission. The relay node is further configured such that the relay node refrains from sending the data packets to the access node.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication in a wireless telecommunications system, the method comprising:
   retaining, by an access node, a copy of data packets that the access node sends to a relay node,
   receiving, by the access node, an indication from the relay node that the access node and the relay node perform coordinated multi-point (CoMP) transmission,
   wherein, in an architecture in which an S1 interface terminates at the relay node, the method further comprises:
      receiving, by the access node, additional information from the relay node;
      using, by the access node, the additional information to identify data packets that will be transmitted using CoMP, wherein the additional information includes at least one of:
         an identifier for a user equipment (UE) involved in the CoMP transmission;
         at least one UE bearer General Packet Radio Service (GPRS) Tunneling Protocol (GTP) tunnel endpoint identifier (TEID); and
         relay node bearer configuration information; and
      additionally receiving, by the access node, from the relay node a complete medium access control protocol data unit without a payload, and the access node places a payload in the medium access control protocol data unit.

2. The method of claim 1, wherein receiving the indication comprises receiving the indication via high layer signaling that includes at least one of:
   medium access control layer signaling;
   radio resource control layer signaling; or
   X2-based signaling.

3. The method of claim 1, further comprising additionally receiving, by the access node, from the relay node information necessary for the access node to form a medium access control transport block.

4. The method of claim 1, further comprising deleting, by the access node, the copy of the data packets upon receiving from the relay node high layer signaling indicating that the access node and the relay node will no longer perform the CoMP transmission.

5. A method for communication in a wireless telecommunications system, the method comprising:
   sending, by a relay node, an indication to an access node that the access node and the relay node perform a coordinated multi-point (CoMP) transmission;
   instructing, by the relay node, the access node to retain a copy of data packets that the access node sends to the relay node; and
   refraining, by the relay node, from sending the data packets back to the access node,
   wherein, in an architecture in which an S1 interface terminates at the relay node,
      the method further comprises:
         sending, by the relay node, additional information to the access node, wherein the additional information includes at least one of:
            an identifier for a user equipment (UE) involved in the CoMP transmission
            at least one UE bearer General Packet Radio Service (GPRS) Tunneling Protocol (GTP) tunnel endpoint identifier (TEID); and
            relay node bearer configuration information; and
         additionally sending, by the relay node, to the access node a complete medium access control protocol data unit without a payload, into which the access node places a payload.

6. The method of claim 5, wherein sending the indication comprises sending the indication via high layer signaling that includes at least one of:
   medium access control layer signaling;
   radio resource control layer signaling; or
   X2-based signaling.

7. The method of claim 5, further comprising:
   additionally sending, by the relay node, to the access node information necessary for the access node to form a medium access control transport block.

8. The method of claim 5, wherein, in the architecture in which the S1 interface terminates at the access node, the access node can use the identifier to identify data packets that will be transmitted using CoMP.

9. The method of claim 5, wherein the relay node sends the access node high layer signaling indicating that the relay node and the access node will no longer perform the CoMP transmission and that the access node should delete the copy of the data packets.

10. An access node in a wireless telecommunications system, the access node comprising:
    a processor configured such that the access node retains a copy of data packets that the access node sends to a relay node, and further configured such that the access node receives from the relay node an indication that the access node and the relay node perform coordinated multi-point (CoMP) transmission,
    wherein, in an architecture in which an S1 interface terminates at the relay node, the access node receives from the relay node additional information that includes at least one of:
       an identifier for a UE involved in the CoMP transmission;
       at least one UE bearer General Packet Radio Service (GPRS) Tunneling Protocol (GTP) tunnel endpoint identifier (TEID); and
       relay node bearer configuration information,
       wherein the access node additionally receives from the relay node a complete medium access control protocol data unit without a payload, and the access node places a payload in the medium access control protocol data unit.

11. The access node of claim 10, wherein the access node receives the indication via high layer signaling that includes at least one of:
    medium access control layer signaling;
    radio resource control layer signaling; or
    X2-based signaling.

12. The access node of claim 10, wherein the access node uses the additional information to identify data packets that will be transmitted using CoMP.

13. The access node of claim 10, wherein the access node additionally receives from the relay node information necessary for the access node to form a medium access control transport block.

14. The access node of claim 10, wherein the access node uses the additional information to identify data packets that will be transmitted using CoMP.

15. The access node of claim 10, wherein the access node deletes the copy of the data packets upon receiving from the relay node high layer signaling indicating that the access node and the relay node will no longer perform the CoMP transmission.

16. A relay node in a wireless telecommunications system, the relay node comprising:
   a processor configured such that the relay node instructs an access node to retain a copy of data packets that the access node sends to the relay node, and further configured such that the relay node refrains from sending the data packets back to the access node, and further configured such that the relay node sends to the access node an indication that the access node and the relay node perform the coordinated multi-point (CoMP) transmission,
   wherein, in an architecture in which an S1 interface terminates at the relay node, the relay node sends the access node additional information that includes at least one of:
   an identifier for a UE involved in the CoMP transmission;
   at least one UE bearer General Packet Radio Service (GPRS) Tunneling Protocol (GTP) tunnel endpoint identifier (TEID); and
   relay node bearer configuration information,
   wherein the relay node additionally sends to the access node a complete medium access control protocol data unit without a payload, into which the access node places a payload.

17. The relay node of claim 16, wherein the relay node sends the indication via high layer signaling that includes at least one of:
   medium access control layer signaling;
   radio resource control layer signaling; or
   X2-based signaling.

18. The relay node of claim 16, wherein the relay node additionally sends to the access node information necessary for the access node to form a medium access control transport block.

19. The relay node of claim 16, wherein, in the architecture in which the S1 interface terminates at the access node, the access node can use the additional information to identify data packets that will be transmitted using CoMP.

20. The relay node of claim 16, wherein the relay node sends the access node high layer signaling indicating that the relay node and the access node will no longer perform the CoMP transmission and that the access node can delete the copy of the data packets.

* * * * *